United States Patent [19]

Matsuoka et al.

[11] 4,018,048

[45] Apr. 19, 1977

[54] EXHAUST REACTION CHAMBER ASSEMBLY FOR INTERNAL COMBUSTION ENGINE

[75] Inventors: Saburo Matsuoka; Kenji Kimura, both of Wako, Japan

[73] Assignee: Honda Giken Kogyo Kabushiki Kaisha, Tokyo, Japan

[22] Filed: Dec. 9, 1975

[21] Appl. No.: 639,204

[30] Foreign Application Priority Data

Dec. 18, 1974 Japan .......................... 49-144548

[52] U.S. Cl. .................................. 60/282; 60/323
[51] Int. Cl.² .......................................... F01N 3/10
[58] Field of Search ................ 60/282, 303, 323

[56] References Cited

UNITED STATES PATENTS 3,413,803  12/1968  Rosenlund ........................ 60/282
3,934,411  1/1976  Masaki .............................. 60/282

Primary Examiner—Douglas Hart
Attorney, Agent, or Firm—Lyon & Lyon

[57] ABSTRACT

An exhaust reaction chamber assembly for use with an internal combustion engine having cylinders in line includes one or more chambers divided by a metal partition to form separate compartments sealed from each other. A downstream chamber which is not divided surrounds and encloses the divided chamber or chambers and also surrounds and encloses a major portion of the length of each of a plurality of exhaust branches which are connected to individual exhaust ports, respectively. In this way the temperature of the exhaust gases is maintained at a high level in order to promote rapid oxidation of HC and CO in the exhaust gases. Two exhaust reaction chamber assemblies are disclosed, one for a six cylinder engine and one for a four cylinder engine.

6 Claims, 4 Drawing Figures

EXHAUST REACTION CHAMBER ASSEMBLY FOR INTERNAL COMBUSTION ENGINE

This invention relates to internal combustion engines having in-line cylinders and is particularly directed to an improved exhaust reaction chamber assembly for maintaining the exhaust gases at a high temperature for a relatively long time period in order to promote the oxidizing of CO and HC in the exhaust gases before they are discharged into the atmosphere. Conventional exhaust reaction chamber assemblies have the disadvantage that exhaust gases in the reaction chambers are subject to mutual interference because of inevitable overlapping in the time periods when the respective exhaust valves are open. As a result, an engine equipped with such a conventional exhaust reaction chamber assembly may be adversely affected in its output performance because of increase in the resistance to flow of exhaust gases.

It is therefore an object of the present invention to provide an improved exhaust reaction chamber assembly for use with a multi-cylinder internal combustion engine, which system is free from the above disadvantage.

According to a major feature of the present invention, there is provided an exhaust reaction chamber assembly having upstream and downstream chambers, at least one upstream chamber being divided by a partition of high thermal conductivity to form a plurality of compartments which are sealed from each other. Since the discharges of exhaust gases from the engine cylinders occur sequentially because of the exhaust timing of the various cylinders, consecutive discharges of exhaust gases occur on opposite sides of the partition. The exhaust gas discharges are therefore free from any mutual interference, thereby minimizing any reduction in engine output performance caused by mutual interference of exhaust gases.

Other and more detailed objects and advantages will appear hereinafter.

Figure 1:
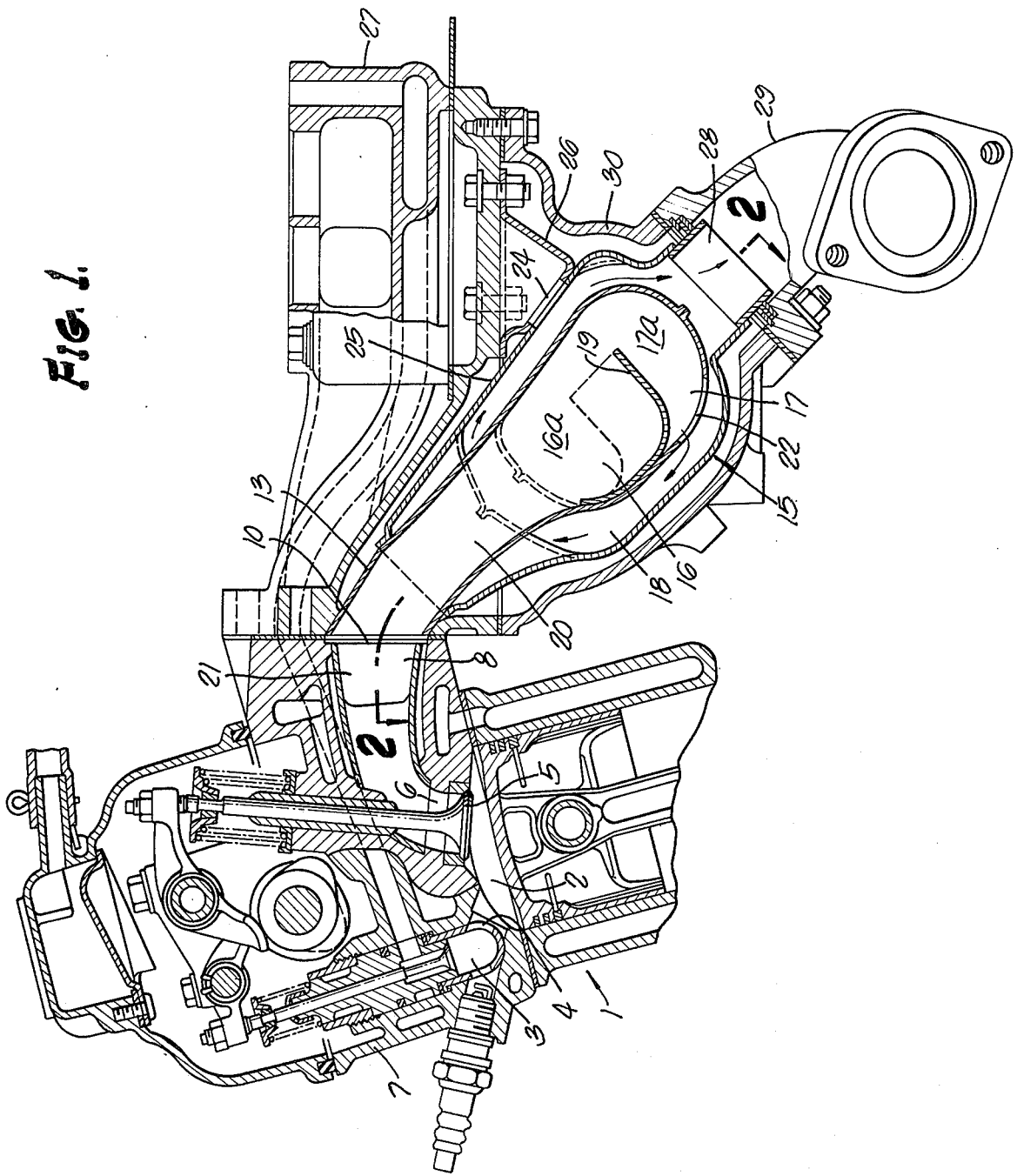
FIG. 1 is a sectional elevation showing a preferred embodiment of this invention for use with a six cylinder engine.
Figure 2:
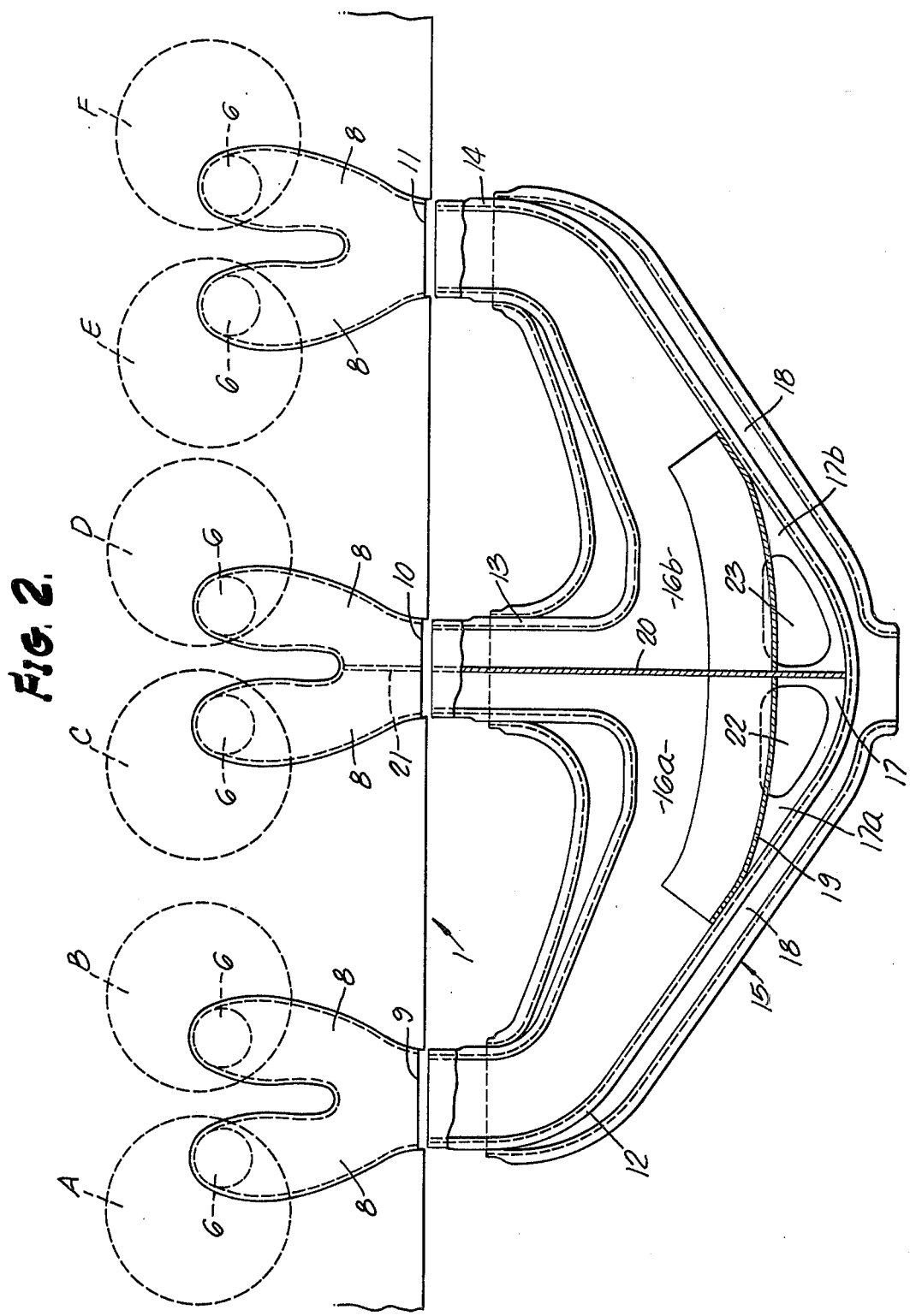
FIG. 2 is a sectional view taken substantially on the lines 2—2 as shown on FIG. 1.

Referring to the drawings, the internal combustion engine generally designated 1 has six cylinders in line. Each cylinder has a main combustion chamber 2 and an auxiliary combustion chamber 3 connected by a torch opening 4. An exhaust valve 5 controls discharge of exhaust gases through exhaust outlets 6. The six exhaust outlets are arranged in three groups of two, each group having two exhaust outlets 6 merging into an exhaust passage 8 in the cylinder head 7, thus forming three exhaust ports 9, 10 and 11.

Exhaust branches 12, 13 and 14 have their respective upstream ends connected to the corresponding exhaust ports 9, 10 and 11, and their downstream ends open into an exhaust reaction chamber assembly generally designated 15. This assembly 15 contains three exhaust reaction chambers, an upstream chamber 16, an intermediate chamber 17, and a downstream chamber 18. The downstream chamber 18 surrounds the upstream chamber 16 and the intermediate chamber 17, and the downstream chamber 18 also surrounds the exhaust branches 12, 13 and 14, all for heat retaining purposes. A baffle 19 is interposed between the upstream chamber 16 and the intermediate chamber 17 so that the engine exhaust gases flowing into the upstream chamber 16 are required to perform a circulating motion upon the baffle 19 before flowing into the intermediate chamber 17.

As is customary, the firing order of the engine cylinders is preset, for example, 1, 5, 3, 6, 2, 4, for the six cylinder engine of the present embodiment. In accordance with this invention, a partition 20 divides the upstream chamber 16 into two compartments 16a and 16b. Similarly, the same partition 20 divides the intermediate chamber into compartments 17a and 17b. An extension 21 of the partition 20 separates the exhaust passage 8 of the cylinder C from the exhaust passage 8 of the cylinder D. The compartment 16a is sealed with respect to the compartment 16b, and similarly, the compartment 17a is sealed from the compartment 17b. Accordingly, the compartment 16a receives exhaust gases from cylinders A, B and C only, while compartment 16b receives exhaust gases from cylinders D, E and F only.

Exhaust gases flow from compartment 16a to compartment 17a around the baffle 19 and then pass through opening 22 into the downstream chamber 18 which is not divided. Similarly, exhaust gases pass from compartment 16b around the baffle 19 into the compartment 17b and then pass through opening 23 into the common downstream chamber 18. Lateral openings 24 in a wall 25 of the downstream chamber 18 and also in a wall of the support member 26 expose the lower face of a portion of the intake manifold 27 in order to preheat the incoming intake mixtures. Exhaust gases finally escape from the exhaust reaction chamber assembly 15 through the outlet sleeve 28 and tailpipe 29. A thick wall housing 30 surrounds the exhaust reaction chamber assembly 15, with clearance space therebetween.

As determined by the firing order of the cylinders, mentioned above, exhaust gases from the cylinder A flow into the upstream compartment 16a; next, the exhaust gases from the cylinder E flow into the upstream compartment 16b. Then, exhaust gases from the cylinder C enter the upstream compartment 16a, followed by entry of exhaust gases from cylinder E into upstream compartment 16b. These separate entries of exhaust gases into the compartments 16a and 16b are carried out alternately and consecutively. Therefore, even if an overlapping in exhaust timing should take place between any two exhaust valves 5, exhaust gases are free from interference with each other. As a result, the internal combustion engine 1 is free from any reduction in its output performance due to increase in exhaust flow resistance.

The exhaust gases flowing into the upstream compartments 16a and 16b perform a circulating motion when they impinge upon the baffle 19, and then flow into the intermediate compartments 17a and 17b, respectively. In the meanwhile, the two streams of the exhaust gases are subjected to equalization in pressure, and are allowed to flow out of the openings 22, 23, respectively, without any difficulty arising from interference between them. The two streams of exhaust gases are then caused to join each other in the downstream reaction chamber 18. The hot gases in the downstream reaction chamber 18 minimize loss of heat from the compartments 16a, 16b, 17a and 17b and from the exhaust branches 12, 13 and 14.

Since the partition 20 and extension 21 are made of material having excellent thermal conductivity, efficient heat exchange is promoted between the compartments 16a and 16b and between the compartments 17a and 17b, so that heat in a compartment on one side of the partition can promote exhaust gas reaction in the compartment on the other side of the partition. It is noted that the partition 21 also divides the middle exhaust branch 13.

Figure 3:
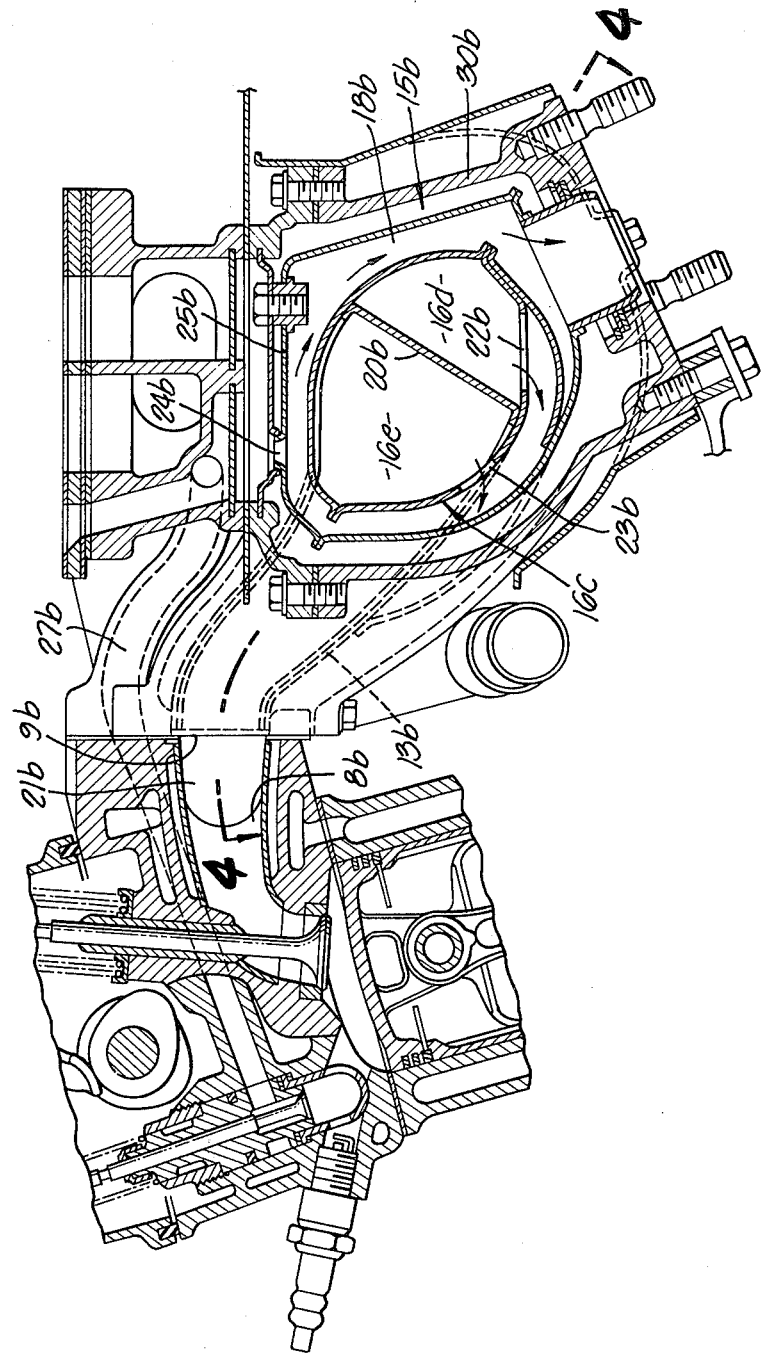
FIG. 3 is a view similar to FIG. 1 showing a modified form of the invention for use with a four cylinder engine.
Figure 4:
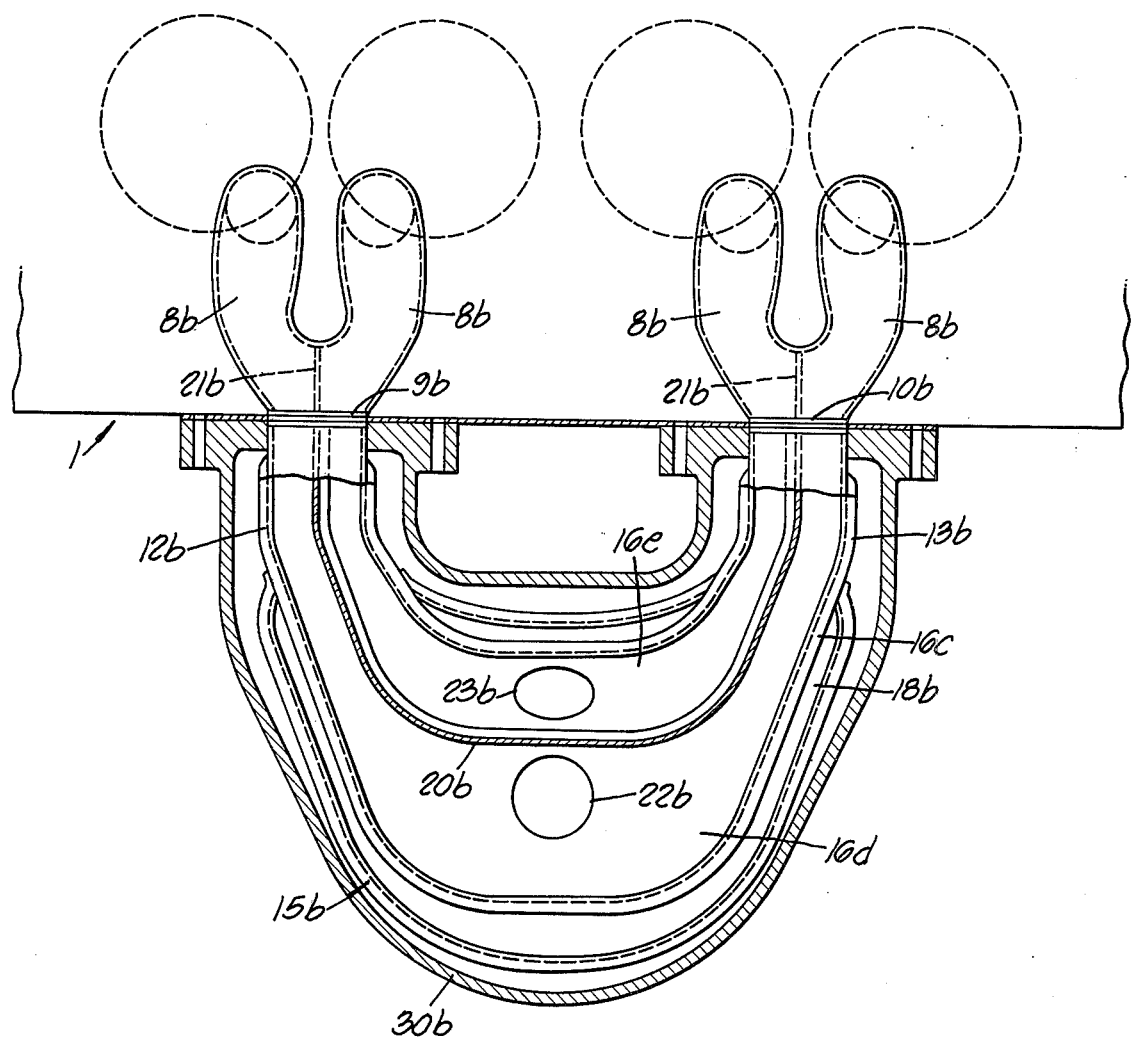
FIG. 4 is a sectional view taken substantially on the lines 4—4 as shown in FIG. 3.

The modified form of the invention shown in FIGS. 3 and 4 relates to an internal combustion engine having four cylinders in line, and a firing order, for example, of 1, 3, 4, 2. In this second embodiment, the four exhaust outlets of the engine cylinders are arranged in two groups, each of which has two exhaust passages 8b merging into a single exhaust port, thus forming two exhaust ports 9b and 10b. These two exhaust ports are connected to the exhaust reaction chamber assembly generally designated 15b through the exhaust branches 12b and 13b. This exhaust reaction chamber assembly 15b includes the upstream reaction chamber 16c and the downstream reaction chamber 18b. The chamber 18b encloses the chamber 16c for heat retaining purposes. The upstream chamber 16c and the exhaust branches 12b and 13b are divided into sealed compartments 16d and 16e by the partition 20b. Extensions 21b are in line with the partition 20b so that the two end cylinders discharge into the same upstream compartment 16d and the two middle cylinders discharge into the upstream compartment 16e. The downstream reaction chamber 18b surrounds and encloses the compartments 16d and 16e of the upstream reaction chamber 16c. An opening 22b connects the compartment 16d to the downstream chamber 18b, and similarly, the opening 23b connects the compartment 16e to the downstream chamber 18b.

With the firing order of the engine cylinders preset at 1, 3, 4, 2, the introduction of exhaust gases into the upstream compartments 16d and 16e is carried out continuously but alternately, thus eliminating any interference between the two consecutive discharges of exhaust gases. As a result, the four cylinder internal combustion engine 1 is free from any reduction in its output performance due to such interference. Moreover, the partition 20b is made of metal of high thermal conductivity, and therefore efficient heat exchange is effected between the compartments 16d and 16e.

An opening 24b is provided in the wall 25b of the downstream reaction chamber 18b, in order to heat intake mixtures in the intake manifold 27b. A thick wall housing 30b encloses the exhaust reaction chamber assembly 15b, with insulating air space therebetween.

In each of the two embodiments as shown in the drawings, the exhaust reaction chamber is divided by a thermally conductive partition into a plurality of compartments which are sealed from each other. The discharges of exhaust gases from the engine cylinders occurs sequentially because of the different exhaust timing of the exhaust valves, and therefore the discharges of exhaust gases are free from any mutual interference, thus minimizing any reduction in engine output performance caused by mutual interference of exhaust gases. Moreover, since efficient heat exchange is carried out through the partition between the exhaust compartments for alternately heating the compartments, and since any considerable reduction in temperature of the exhaust gases is prevented by merging the streams of exhaust gases from the respective compartments, the exhaust reaction is efficiently carried out to minimize discharge into the atmosphere of carbon monoxide and unburned hydrocarbons.

While this invention has been shown and described in connection with an engine having an auxiliary combustion chamber associated with each main combustion chamber, and operating on an overall air-fuel ratio leaner than the stoichiometric value, this is by way of illustration only. The device of this invention is also useful with engines whose air-fuel ratio is richer than the stoichiometric value, in which case air for reaction is supplied to each exhaust branch.

Having fully described our invention, it is to be understood that we are not to be limited to the details herein set forth, but that our invention is of the full scope of the appended claims.

We claim:

1. In an exhaust reaction chamber assembly for use with an internal combustion engine having a plurality of exhaust ports of different exhaust timing, the improvement comprising, in combination: walls forming an upstream reaction chamber, exhaust branches each having an intake end for connection to one of said exhaust ports, respectively, and each communicating with said upstream reaction chamber, a downstream reaction chamber enclosing and surrounding said upstream reaction chamber and enclosing and surrounding a major portion of the length of each of said exhaust branches, a metal partition of high thermal conductivity dividing said upstream reaction chamber and at least one of said exhaust branches into two compartments sealed from each other, so that exhaust gas discharges occur alternately to said upstream chamber on opposite sides of said partition, and openings whereby exhaust gases may pass from said compartments into said downstream reaction chamber.

2. The combination set forth in claim 1 in which an intermediate reaction chamber is provided between the upstream reaction chamber and the downstream reaction chamber, and wherein said intermediate reaction chamber is divided into two compartments by said partition.

3. In an exhaust reaction chamber assembly for use with a six cylinder internal combustion engine having three in-line exhaust ports each connected to receive exhaust gases from two adjacent exhaust ports of different exhaust timing, the improvement comprising, in combination: walls forming an upstream reaction chamber, three in-line exhaust branches each having an intake end for connection to one of said first mentioned exhaust ports, respectively, and each communicating with said upstream reaction chamber, an intermediate reaction chamber, a downstream reaction chamber enclosing and surrounding said upstream and intermediate reaction chambers and enclosing and surrounding a major portion of the length of said exhaust branches, a metal partition of high thermal conductivity dividing said upstream chamber and the middle exhaust branch into two compartments sealed from each other, so that exhaust gas discharges occur alternately to said upstream chamber on opposite sides of said partition, said partition also dividing said intermediate reaction chamber into two compartments sealed from each other, and openings whereby exhaust gases may pass from said upstream compartments into said intermediate compartments and then into said downstream reaction chamber.

4. The combination set forth in claim 3 in which an extension of said partition is provided between the two adjacent exhaust ports in the middle exhaust branch.

5. In an exhaust reaction chamber assembly for use with a four cylinder internal combustion engine having two exhaust ports each connected to receive exhaust gases from two adjacent exhaust ports of different exhaust timing, the improvement comprising, in combination: walls forming an upstream reaction chamber, two exhaust branches each having an intake end for connection to one of said first mentioned exhaust ports, respectively, and each communicating with said upstream reaction chamber, a downstream reaction chamber enclosing and surrounding said upstream reaction chamber and enclosing and surrounding a major portion of the length of each of said exhaust branches, a metal partition of high thermal conductivity dividing said upstream chamber and exhaust branches into two compartments sealed from each other, so that exhaust gas discharges occur alternately to said upstream chamber on opposite sides of said partition, and openings whereby exhaust gases may pass from said compartments into said downstream reaction chamber.

6. The combination set forth in claim 5 in which an extension of said partition is provided between the two adjacent exhaust ports in each exhaust branch.

* * * * *

UNITED STATES PATENT AND TRADEMARK OFFICE
CERTIFICATE OF CORRECTION

PATENT NO. : 4,018,048
DATED : April 19, 1977
INVENTOR(S) : SABURO MATSUOKA et al It is certified that error appears in the above-identified patent and that said Letters Patent are hereby corrected as shown below:

Claim 3, line 61, after "length of" insert --each of--.

Signed and Sealed this thirtieth Day of August 1977

[SEAL]

Attest:

RUTH C. MASON
Attesting Officer

C. MARSHALL DANN
Commissioner of Patents and Trademarks